United States Patent
Kageyama

(10) Patent No.: US 8,295,483 B2
(45) Date of Patent: Oct. 23, 2012

(54) MOBILE TERMINAL DEVICE, WIRELESS COMMUNICATION UNIT, WIRELESS COMMUNICATION SYSTEM, AND WIRELESS COMMUNICATION METHOD

(75) Inventor: Takatoshi Kageyama, Yokohama (JP)

(73) Assignee: Panasonic Corporation, Osaka (JP)

( * ) Notice: Subject to any disclaimer, the term of this patent is extended or adjusted under 35 U.S.C. 154(b) by 419 days.

(21) Appl. No.: 12/664,374

(22) PCT Filed: Jun. 19, 2007

(86) PCT No.: PCT/JP2007/062326
§ 371 (c)(1),
(2), (4) Date: Dec. 11, 2009

(87) PCT Pub. No.: WO2008/155823
PCT Pub. Date: Dec. 24, 2008

(65) Prior Publication Data
US 2010/0199339 A1 Aug. 5, 2010

(51) Int. Cl.
*H04K 1/00* (2006.01)
(52) U.S. Cl. .......... 380/247; 380/36; 380/250; 380/258; 726/7
(58) Field of Classification Search .............. 380/36, 380/247, 250, 258, 270; 726/2, 7; 713/168
See application file for complete search history.

(56) References Cited

U.S. PATENT DOCUMENTS

| | | | |
|---|---|---|---|
| 2001/0056305 A1* | 12/2001 | Moriya et al. | 700/23 |
| 2005/0138356 A1* | 6/2005 | Hurwitz | 713/155 |
| 2009/0265775 A1* | 10/2009 | Wisely et al. | 726/9 |
| 2010/0228966 A1* | 9/2010 | Yamaguchi | 713/155 |

FOREIGN PATENT DOCUMENTS

| | | | |
|---|---|---|---|
| EP | 1855260 A1 * | 11/2007 | |
| JP | 2001-209874 A | 8/2001 | |
| JP | 2002-024108 A | 1/2002 | |
| JP | 2003-217067 A | 7/2003 | |
| JP | 2006-343983 A | 12/2006 | |
| JP | 2007-067537 A | 3/2007 | |

OTHER PUBLICATIONS

International Search Report, mailed Oct. 2, 2007, issued in corresponding International Application No. PCT/JP2007/062326, filed Jun. 19, 2007.

* cited by examiner

*Primary Examiner* — Samson Lemma
(74) *Attorney, Agent, or Firm* — Seed IP Law Group PLLC

(57) ABSTRACT

A mobile terminal device, a wireless communication unit, a wireless communication system, and a wireless communication method by which 1:N communication can be realized at low power consumption and a CH occupation time can be shortened. After each terminal transmits an authorization request, it performs a carrier sense with the pattern corresponding to the transmission timing and waits for authorization response from a key unit (200). The key unit (200) transmits the authorization response at the timing when the carrier sense timings of a plurality of terminals which are authenticated in response to the authorization request from the terminal are coincident with each other. Accordingly, the key unit (200) performs transmission only to the authenticated terminals at one time, and 1:N communication can be realized at low power consumption.

17 Claims, 15 Drawing Sheets

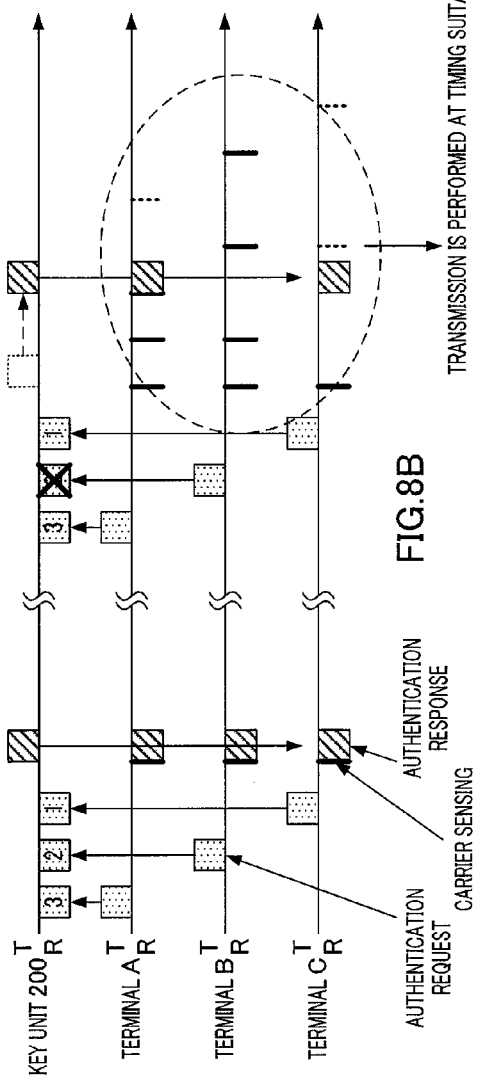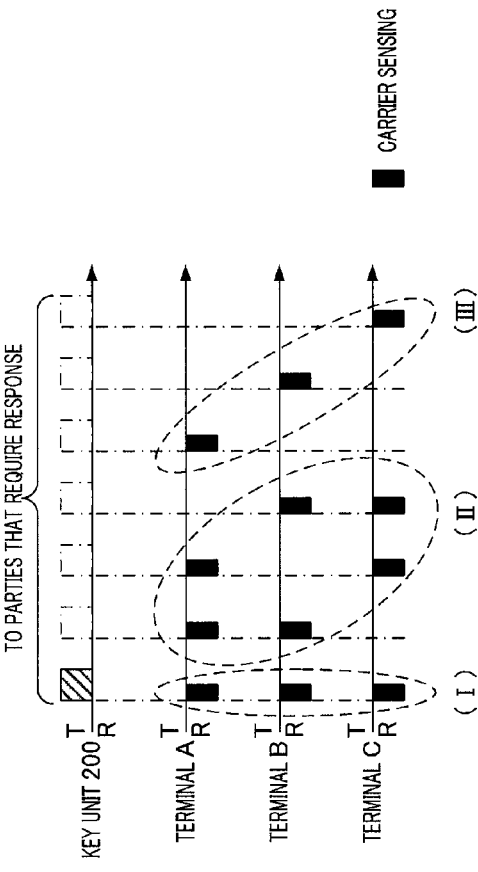

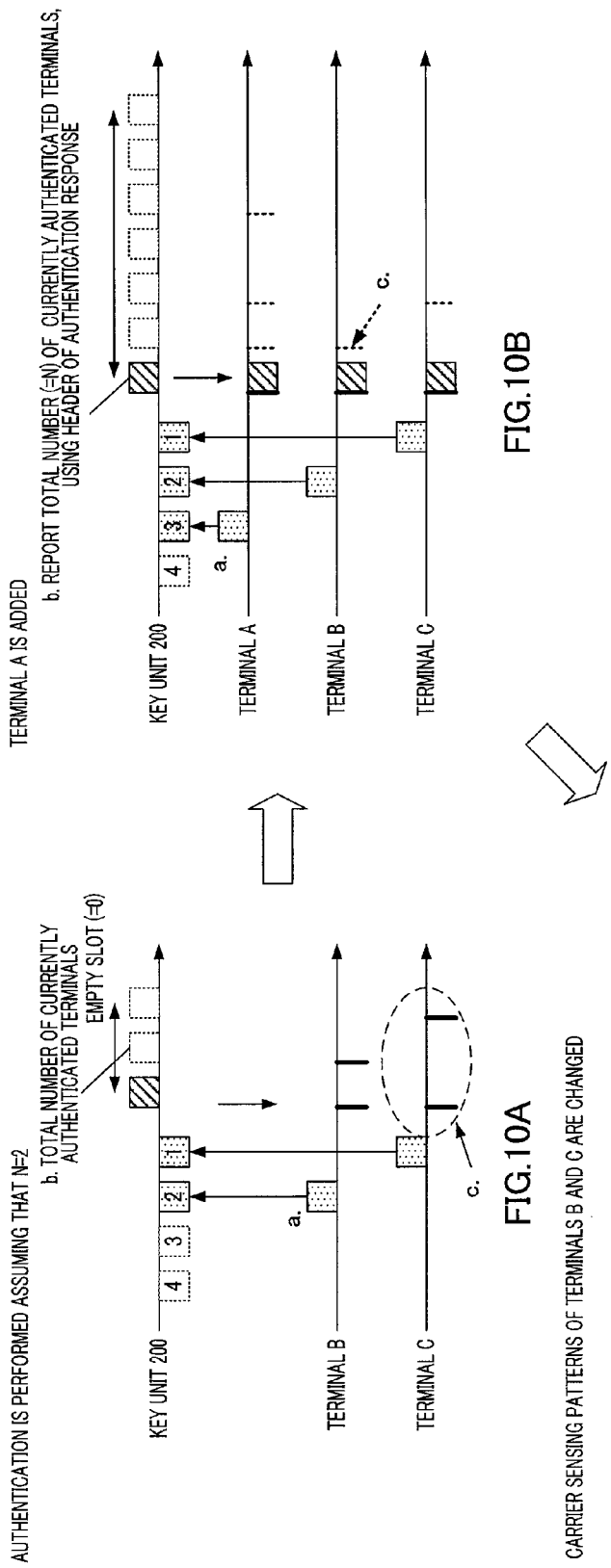

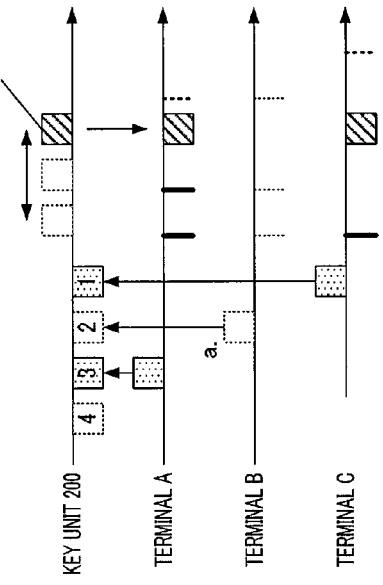
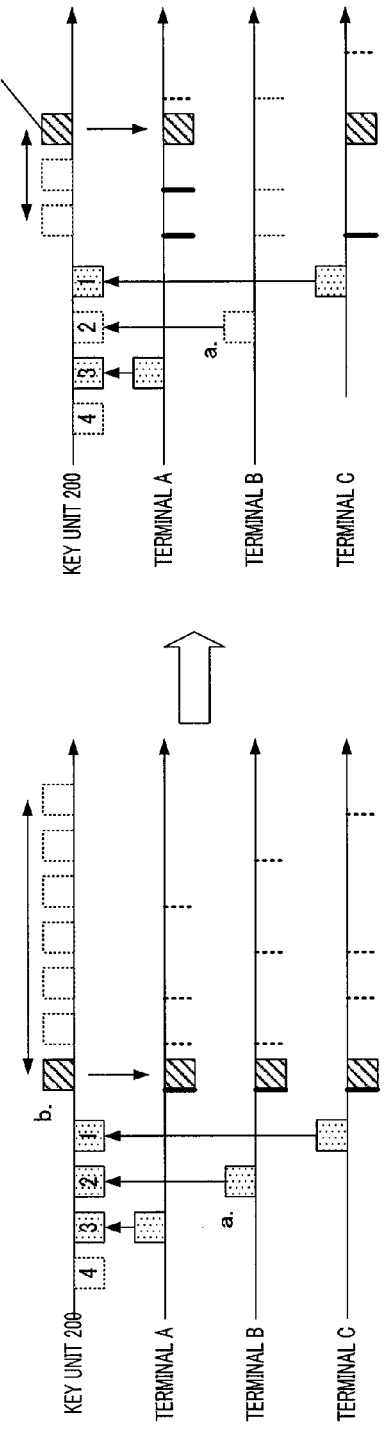
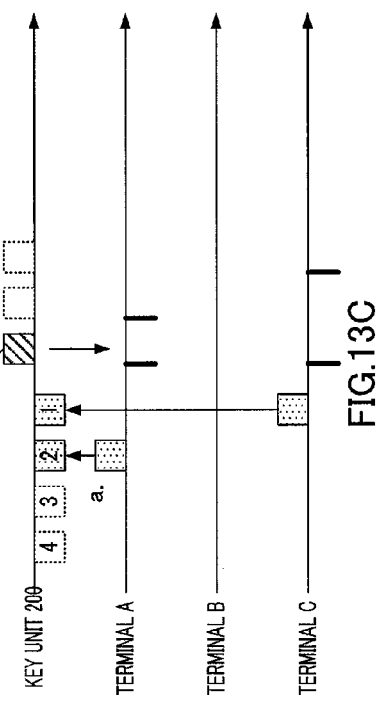

MOBILE TERMINAL DEVICE, WIRELESS COMMUNICATION UNIT, WIRELESS COMMUNICATION SYSTEM, AND WIRELESS COMMUNICATION METHOD

TECHNICAL FIELD

The present invention relates to: a mobile terminal apparatus such as a mobile telephone, which performs wireless authentication by transmitting and receiving radio signals to and from a wireless communication unit; a wireless communication unit; a wireless communication system; and a wireless communication method. More particularly, the present invention relates to a wireless communication system that realizes 1-to-N communication with low power consumption.

BACKGROUND ART

It is important to save power in a 1-to-N communication system in which one base unit communicates with a plurality of handsets.

Patent Document 1 discloses a security communication apparatus that saves power with a simple configuration in which each handset performs transmission at the timing set in advance for each handset, and the base unit identifies each handset based on the time lags between the transmission timings of handsets.

Patent Document 2 discloses a wireless system where a handset saves power by performing carrier sensing when an applicable timing comes to the handset in 1-to-N intermittent reception and by stopping carrier sensing when timings come to other handsets.

Now, device use limiting apparatuses that disable the use of a device itself such as a mobile telephone when the device is left or stolen and carried away from the hands of the owner or user, and gives a warning that the device is more than a predetermined distance away, are becoming popular.

FIG. 1 illustrates a use limiting method for limiting the use of a mobile terminal apparatus using wireless authentication communication.

As shown in FIG. 1, when mobile terminal apparatus 10 such as a mobile telephone is carried away from the hands of user 1 and goes out of the authentication distance, the use of mobile terminal apparatus 10 is disabled and wireless communication unit (hereinafter "key unit") 20 owned by user 1 sounds an alarm to warn that mobile terminal apparatus 10 is left. To be more specific, in a system where wireless authentication is performed by receiving radio signals between key unit 20 and the use delimiting unit of mobile terminal apparatus 10, when each unit detects that a received level goes below a predetermined value, the use of mobile terminal apparatus 10 is limited by stopping transmission of use delimiting signals from the use delimiting unit, and key unit 20 outputs a warning signal. By this means, it is possible to prevent a mobile terminal apparatus from being left or stolen.

FIG. 2 is a block diagram in which a use limiting method of the mobile terminal apparatus of FIG. 1 is implemented.

FIG. 2 shows: mobile terminal apparatus 10 such as a mobile telephone/PHS (Personal Handy-Phone System), PDA (Personal Digital Assistants), notebook PC, MP3 player and HDD player; and key unit 20 that, when the distance is spaced more than a predetermined distance apart, automatically locks mobile terminal apparatus 10 and sounds an alarm by communicating (i.e. polling) with mobile terminal apparatus 10. Mobile terminal apparatus 10 and key unit 20 have wireless authentication sections 11 and 21, respectively, for performing wireless authentication with each other. Key unit 20 is driven by battery 22.

Wireless authentication section 21 of key unit 20 and wireless authentication section 11 of mobile terminal apparatus 10 perform authentication utilizing wireless communication. Wireless authentication section 21 of key unit 20 and wireless authentication section 11 of mobile terminal apparatus 10 have ID's associated in advance, and perform authentication at all times by learning by means of wireless communication that these ID's are the pair.

FIG. 3 shows the basic operations of wireless authentication between mobile terminal apparatus 10 and key unit 20.

As shown in FIG. 3, key unit 20 transmits search signals on a regular basis using a search channel during a search. Mobile terminal apparatus 10 that receives this search signal cross-checks the ID of mobile terminal apparatus 10 and the ID of key unit 20 included in the search signal, and returns a response signal if the ID's form a pair that is registered in advance. Key unit 20 also cross-checks the ID of the mobile terminal apparatus included in the response signal and the ID of key unit 20. After the above initial authentication is finished, authentication starts using an authentication channel. During authentication, authentication is performed by sending data encrypting random numbers (i.e. authentication signal 1), from mobile terminal apparatus 10, and sending data decoding the random numbers (i.e. authentication signal 1'), from key unit 20.

While mobile terminal apparatus 10 and key unit 20 authenticate each other, it is possible to operate mobile terminal apparatus 10 without any problem. In case where authentication is not performed adequately, the operation of mobile terminal apparatus 10 is limited and key unit 20 sounds an alarm.

FIG. 4 shows a use limiting system formed with one key unit and a plurality of mobile terminal apparatuses. As shown in FIG. 4, a plurality of mobile terminal apparatuses that perform wireless authentication with key unit 20 are terminal A of a mobile telephone, terminal B of a digital camera and terminal C of a mobile printer. Key unit 20 and these terminals A to C form a use limiting system and perform 1-to-N communication. Although FIG. 4 shows an example of a combination with three mobile terminal apparatuses, combinations with a greater number of mobile terminal apparatuses such as PDA's and notebook PC's are possible.

FIG. 5 shows the operations of wireless authentication between key unit 20 and terminals A to C of FIG. 4. As shown in FIG. 5, key unit 20 performs 1-to-1 communication with terminals A to C. For example, when terminal A transmits an authentication request to key unit 20, key unit 20 returns an authentication response to terminal A. Similarly, when terminal B transmits an authentication request to key unit 20, key unit 20 returns an authentication response to terminal B and, when terminal C transmits an authentication request to key unit 20, key unit 20 returns an authentication response to terminal C. In this way, 1-to-N communication in the use limiting system combines the operations of 1-to-1 wireless authentication of FIG. 3 corresponding to the number of mobile terminal apparatuses.

Patent Document 1: Japanese Patent Application Laid-Open No. 2001-209874

Patent Document 2: Japanese Patent Application Laid-Open No. 2003-217067

DISCLOSURE OF INVENTION

Problems to be Solved by the Invention

However, with such a conventional 1-to-N communication system, if the base unit is driven by a battery, it is necessary to make power consumption lower.

Particularly, with the use limiting system shown in FIG. 5, when 1-to-N communication is performed, power consumption in key unit 20 increases and the longevity of battery 22 (FIG. 2) becomes short. Key unit 20 is provided only with battery 22 of a comparatively small capacity due to the limitation in the housing and so on, and battery 22 consumes great power if 1-to-1 communications shown in FIG. 5 are combined.

Further, key unit 20 and each mobile terminal apparatus occupy a search channel and authentication channel shown in FIG. 3. Interference is more likely to occur because the time to occupy channels becomes longer.

In view of the above, it is an object of the present invention to provide a mobile terminal apparatus, wireless communication unit, wireless communication system and wireless communication method that can realize 1-to-N communication with low power consumption and shorten the time to occupy channels.

Means for Solving the Problem

The mobile terminal apparatus according to the present invention that performs wireless communication with a wireless communication unit employs a configuration and which includes: a wireless authentication section that performs wireless authentication by transmitting and receiving radio signals to and from the wireless communication unit: and a carrier sensing section that determines a carrier sensing pattern for receiving an authentication response from the wireless communication unit, according to a timing to transmit an authentication response to the wireless communication unit and that performs carrier sensing according to the carrier sensing pattern.

The wireless communication unit according to the present invention that performs wireless communication with a plurality of mobile terminal apparatuses employs a configuration which includes: a wireless authentication controlling section that performs wireless authentication by transmitting and receiving radio signals to and from the mobile terminal apparatuses; and a controlling section that cross-checks authentication requests from the mobile terminal apparatuses and that transmits an authentication response at a carrier sense timing only mobile terminal apparatuses that are successfully authenticated receive the authentication response successfully.

The wireless communication system according to the present invention that is formed with a wireless communication unit and a plurality of mobile terminal apparatuses performing wireless authentication by transmitting and receiving radio signals to and from the wireless communication unit, employs a configuration in which: the mobile terminal apparatuses each has: a wireless authentication section that performs wireless authentication by transmitting and receiving radio signals to and from the wireless communication unit; a carrier sensing section that determines a carrier sensing pattern for receiving an authentication response from the wireless communication unit, according to a timing to transmit an authentication response to the wireless communication unit and that performs carrier sensing according to the carrier sensing pattern; and the wireless communication unit has: a wireless authentication section that performs wireless authentication by transmitting and receiving radio signals to and from the mobile terminal apparatuses; and a controlling section that cross-checks authentication requests from the mobile terminal apparatuses and that transmits the authentication response at a carrier sense timing only mobile terminal apparatuses that are successfully authenticated receive the authentication response successfully.

The wireless communication method according to the present invention includes the steps of: performing wireless authentication by transmitting and receiving radio signals to and from a wireless communication unit; determining a carrier sensing pattern for receiving an authentication response from the wireless communication unit, according to a timing to transmit an authentication response to the wireless communication unit; and performing carrier sensing according to the determined carrier sensing pattern.

The wireless communication method according to the present invention includes the steps of: performing wireless authentication by transmitting and receiving radio signals to and from a plurality of mobile terminal apparatuses; and cross-checking authentication requests from a plurality of mobile terminal apparatuses and transmitting an authentication response at a carrier sense timing only mobile terminal apparatuses that are successfully authenticated receive the authentication response successfully.

The wireless communication method according to the present invention in a wireless communication system formed with a plurality of mobile terminal apparatuses that perform wireless authentication with a wireless communication unit includes that: the mobile terminal apparatus side executes the steps of: performing wireless authentication by transmitting and receiving radio signals to and from the wireless communication unit; determining a carrier sensing pattern for receiving an authentication response from the wireless communication unit, according to a timing to transmit an authentication response to the wireless communication unit; and performing carrier sensing according to the determined carrier sensing pattern; and the wireless communication unit side executes the steps of: performing wireless authentication by transmitting and receiving radio signals to and from a plurality of mobile terminal apparatuses; and cross-checking authentication requests from a plurality of mobile terminal apparatuses and transmitting the authentication response at a carrier sense timing only mobile terminal apparatuses that are successfully authenticated receive the authentication response successfully.

Advantageous Effects of Invention

According to the present invention, it is possible to realize 1-to-N communication with low power consumption and reduce power consumption of a wireless communication unit driven by a battery, in a use limiting system.

Further, it is possible to reduce the time to occupy a band in transmission and reception for authentication, and, consequently, it is possible to increase the number of pairs coexisting per channel and reduce the influence of interference.

BRIEF DESCRIPTION OF DRAWINGS

FIG. 8 shows the operation of wireless authentication between a wireless communication unit and mobile terminal apparatus according to an embodiment of the present invention;

FIG. 10 illustrates the operations of a wireless communication unit and mobile terminal apparatus according to an embodiment of the present invention in case where the number of N slots increases from two to three in 1-to-N communication;

FIG. 13 illustrates the operations of a wireless communication unit and mobile terminal apparatus according to an embodiment of the present invention in case where the number of N slots decreases from three to two in 1-to-N communication;

BEST MODE FOR CARRYING OUT THE INVENTION

An embodiment of the present invention will be explained in detail below with reference to the accompanying drawings.

Embodiment

Figure 6:
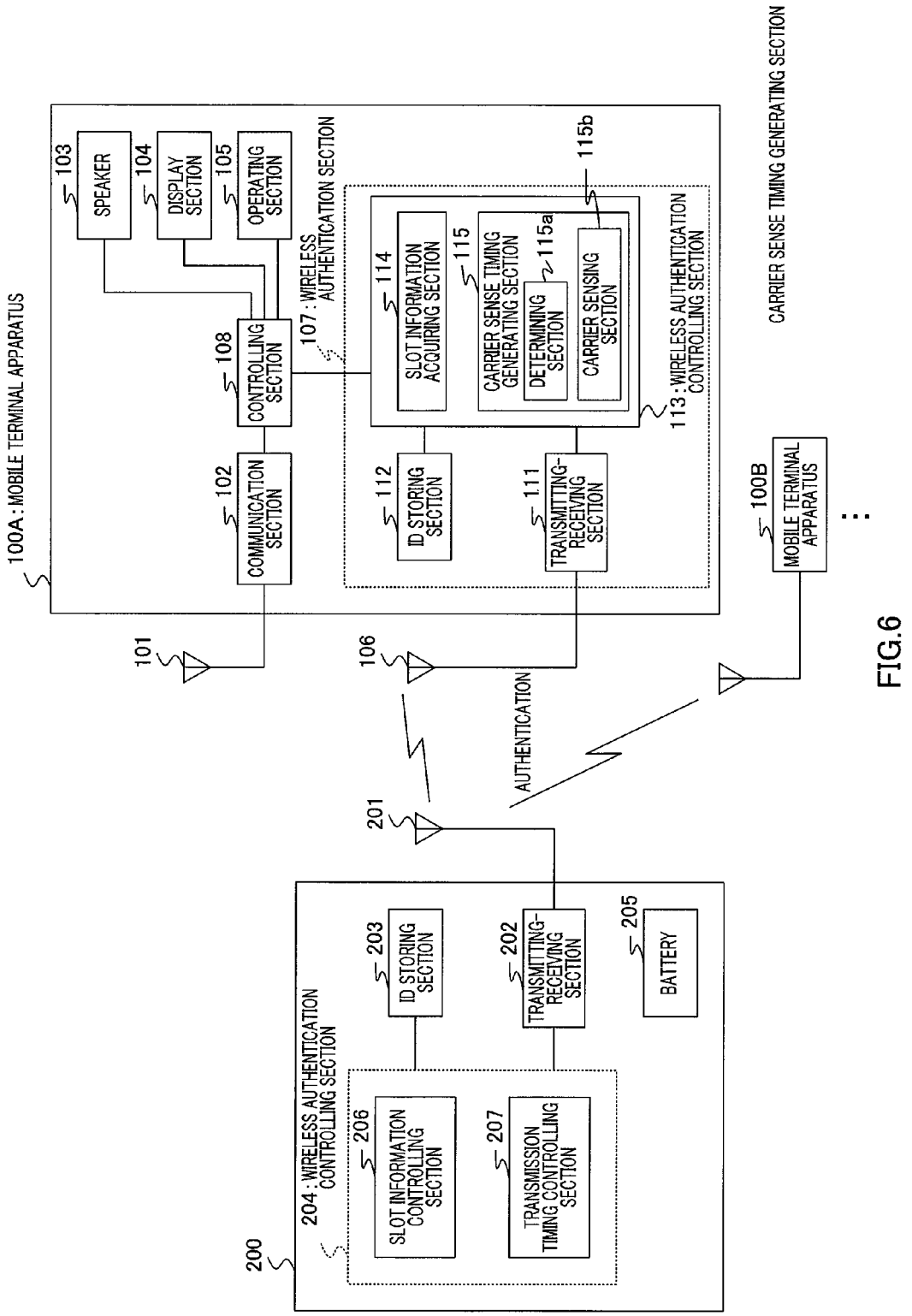
FIG. 6 is a block diagram showing configurations of a wireless communication unit and mobile terminal apparatus according to an embodiment of the present invention.

FIG. 6 is a block diagram showing configurations of a wireless communication unit and mobile terminal apparatus forming a 1-to-N communication system according to an embodiment of the present invention. The present embodiment provides an example of a wireless communication unit and a mobile terminal apparatus that is applied to a mobile telephone using an authentication limiting apparatus.

In FIG. 6, the 1-to-N communication system of the present embodiment is formed with: mobile terminal apparatuses 100A and 100B such as mobile telephones/PHS's (Personal Handy-Phone Systems), PDA's (Personal Digital Assistants), notebook PC's, MP3 players and HDD players; and wireless communication unit (hereinafter, "key unit") 200 that performs bi-directional wireless communication for authentication with mobile terminal apparatuses 100A and 100B.

Mobile terminal apparatus 100A and mobile terminal apparatus 100B employ the same configuration, and therefore mobile terminal apparatus 100A will be explained as a representative.

Mobile terminal apparatus 100A has antenna 101, communication section 102, speaker 103, display section 104, operating section 105, antenna 106, wireless authentication section 107 and controlling section 108. Further, although not shown, mobile terminal apparatus 100A further has as external outputting sections an LCD display section, LED section, microphone, vibrator and a speech synthesis outputting section that uses a PCM codec.

Communication section 102 refers to a carrier communication section and a data processing section of mobile terminal apparatus 100. The present embodiment provides an example where mobile terminal apparatus 100 is applied to a mobile telephone, and therefore shows a communication function of the main body of the mobile telephone. However, if mobile terminal apparatus 100 is a PDA, notebook PC, MP3 player, or HDD player, this communication function serves as the functioning section of the main body of these mobile devices. Communication section 102 can use the functions of the main body (here, communication function) after receiving a use delimiting signal sent out from wireless authentication section 107 through controlling section 108. The use of part or all of the functions of the main body is limited if a use delimiting signal is not received or a use limiting signal is received.

Display section 104 is formed with an LCD display and each driver, and displays, for example, information such as incoming call information and content. Further, display section 104 displays operation guidance, received information, and information such as images and text information.

Operating section 105 receives as input key operations by the user and generates key operation information. Operating section 105 is formed with: a telephone function key for, for example, receiving a call, making a call, switching the telephone function, and determining an operation; a mode key for switching various functions; a cursor key for moving a selection target in upward, downward, left and right directions; and a dial key for inputting telephone numbers. Further, operating section 105 is a touch panel or keyboard if mobile terminal apparatus 100A is a PDA, and an inputting apparatus such as keys or a jog dial that supply inputs to the user terminal if mobile terminal apparatus 100A is a mobile telephone.

Wireless authentication section 107 performs wireless communication with key unit 200 through antenna 106 to perform wireless authentication with each other, and outputs a use limiting signal if authentication is not successful. Wireless authenticating section 107 has: transmitting-receiving section 111 that transmits and receives ID's and so on; authentication ID storing section 112 that stores an ID for performing authentication; and wireless authentication controlling section 113 that cross-checks a stored ID and a received ID, and wireless authentication controlling section 113 has: slot information acquiring section 114; and carrier sense timing generating section 115.

Slot information acquiring section 114 acquires a slot number from key unit 200 and the total number of terminals authenticated by key unit 200.

Carrier sense timing generating section 115 determines a carrier sense timing based on the acquired slot number and the total number of currently authenticated terminals, and generates a carrier sensing pattern. To be more specific, carrier sense timing generating section 115 has: determining section 115a that determines a carrier sensing pattern for receiving an authentication response from key unit 200, according to the timing to transmit an authentication request to key unit 200; and carrier sensing section 115b that performs carrier sensing according to the determined carrier sensing pattern. The generation of a slot number and the carrier sense timing generated based on the slot number will be described later using FIGS. 8A to C.

On the other hand, key unit 200 has: antenna 201 that performs wireless communication with wireless authentication sections 107 of mobile terminal apparatuses 100A and 100B; transmitting-receiving section 202 that transmits and receives ID's and so on; ID storing section 203 that stores the ID's for performing authentication; wireless authentication controlling section 204 that cross-checks stored ID's and received ID's; and battery 205 that supplies power to each section, and wireless authentication controlling section 204 has: slot information controlling section 206; and transmission timing controlling section 207.

Slot information controlling section 206 assigns slot numbers sequentially to mobile terminal apparatuses that are successfully authenticated. Transmitting-receiving section 202 reports a slot number and a total number of mobile terminal apparatuses authenticated by key unit 200.

Transmission timing controlling section 207 controls the transmission timing of an authentication response, to a timing all of mobile terminal apparatuses from which authentication requests are successfully received perform carrier sensing.

Wireless authentication controlling section 204 of key unit 200 and wireless authentication section 107 of mobile terminal apparatus 100 are formed with communication modules that perform bi-directional wireless communication with low power consumption using, for example, 400 MHz of a specific low power radio frequency band.

Although FIG. 6 shows one key unit 200 and two mobile terminal apparatuses 100A and 100B, the number of mobile terminal apparatuses may be three or more and the mobile terminal apparatuses perform 1-to-N communication with key unit 200.

The operations of 1-to-N communication between the key unit and the mobile terminal apparatus configured as described above will be explained below. In the following explanation of the operations, a mobile terminal apparatus will be simply referred to as a "terminal," for ease of explanation.

First, the basic idea of the 1-to-N communication scheme according to the present invention will be explained.

Figure 7:
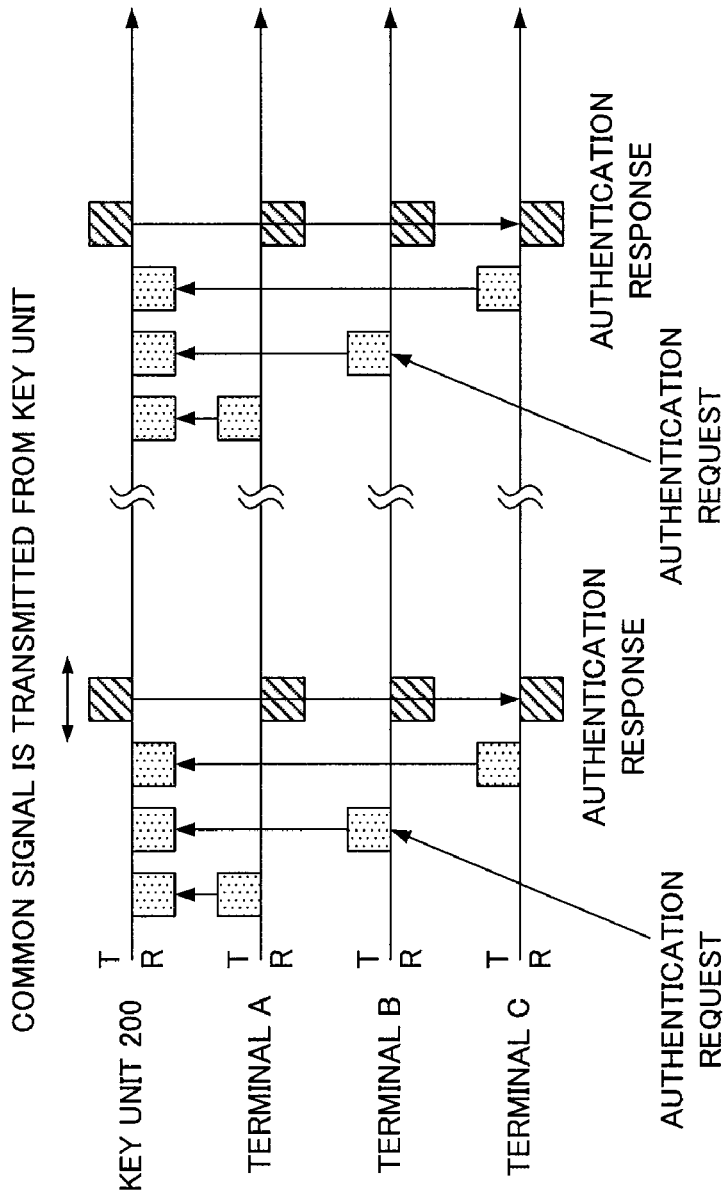
FIG. 7 shows the operation of wireless authentication between a wireless communication unit and mobile terminal apparatus according to an embodiment of the present invention.

FIG. 7 shows the operations of wireless authentication by the key unit and terminals A to C according to the 1-to-N communication scheme of the present embodiment. Terminal A and terminal B of FIG. 7 are mobile terminal apparatuses 100A and 100B of FIG. 6, and terminal C is a mobile terminal apparatus that is not shown in FIG. 6.

As shown in FIG. 7, when receiving an authentication request from each terminal A to C, key unit 200 transmits a common authentication response signal to each terminal A to C. Key unit 200 transmits an authentication response at the timing the carrier sense timings of a plurality of terminals successfully authenticated by the authentication requests match. That is, key unit 200 sends an authentication response signal at a timing only the parties that can be authenticated receive this signal successfully.

Figure 1:
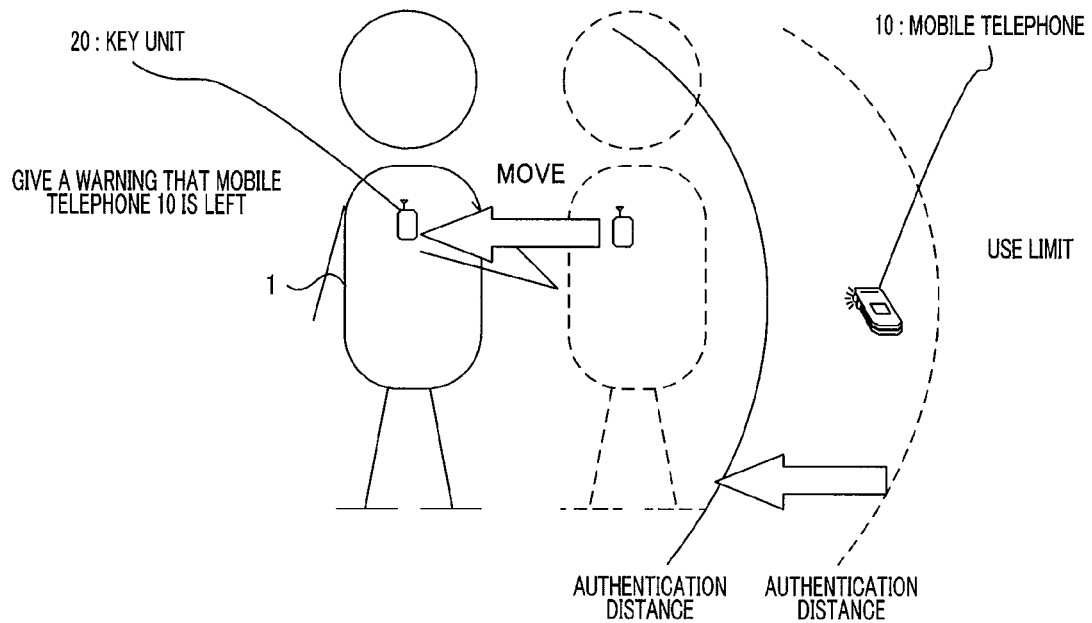
FIG. 1 illustrates a use limiting method for limiting the use of a mobile terminal apparatus using conventional wireless authentication communication.
Figure 2:
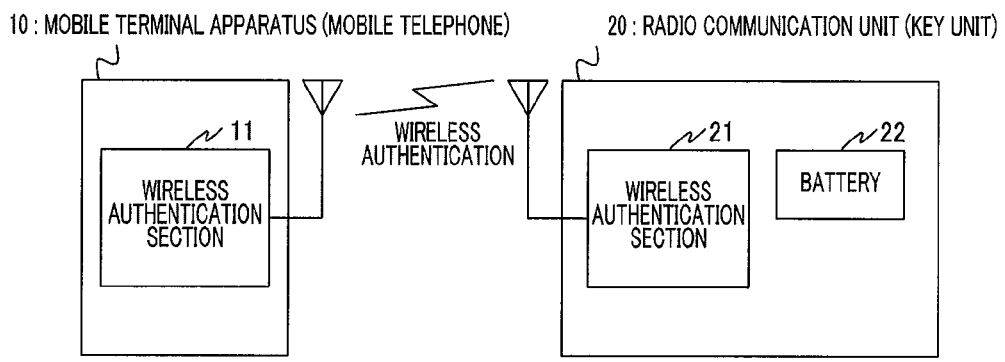
FIG. 2 is a block diagram in which the method of limiting the use of the mobile terminal apparatus of FIG. 1 is implemented.
Figure 3:
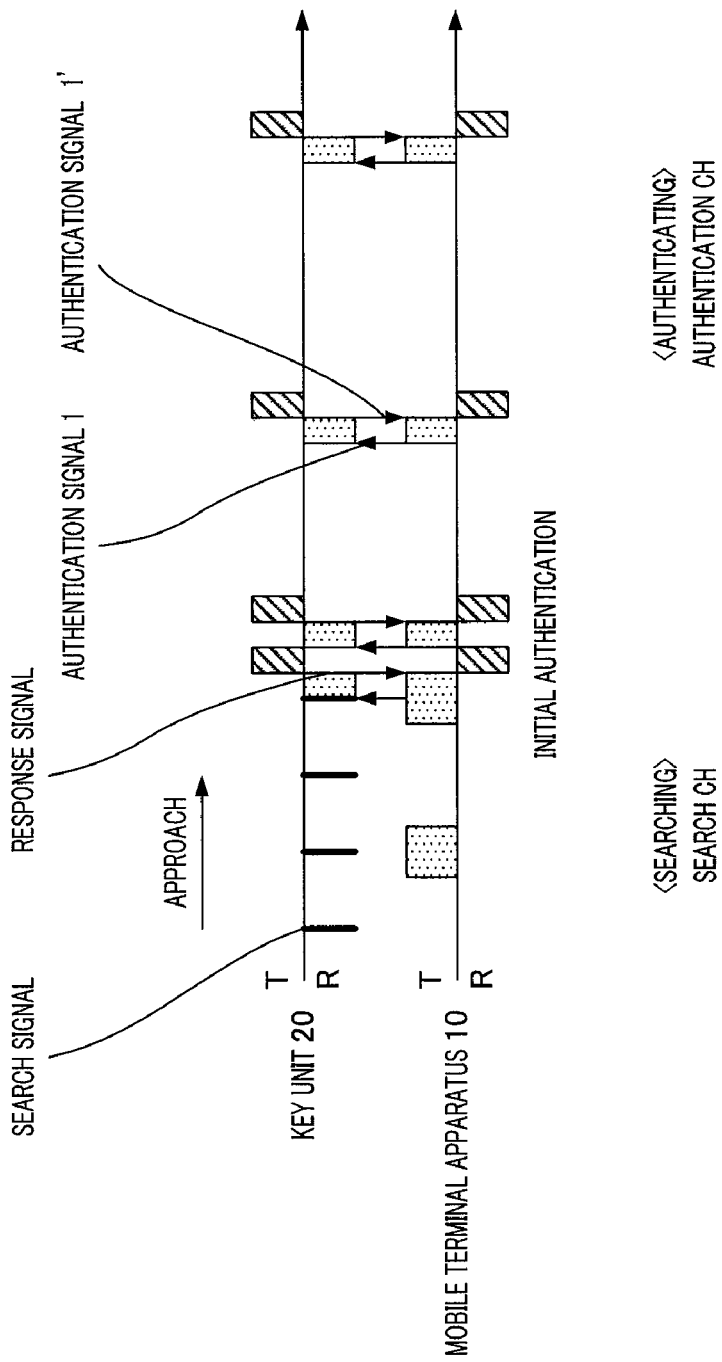
FIG. 3 shows the basic operation of wireless authentication between a conventional mobile terminal apparatus and key unit.
Figure 4:
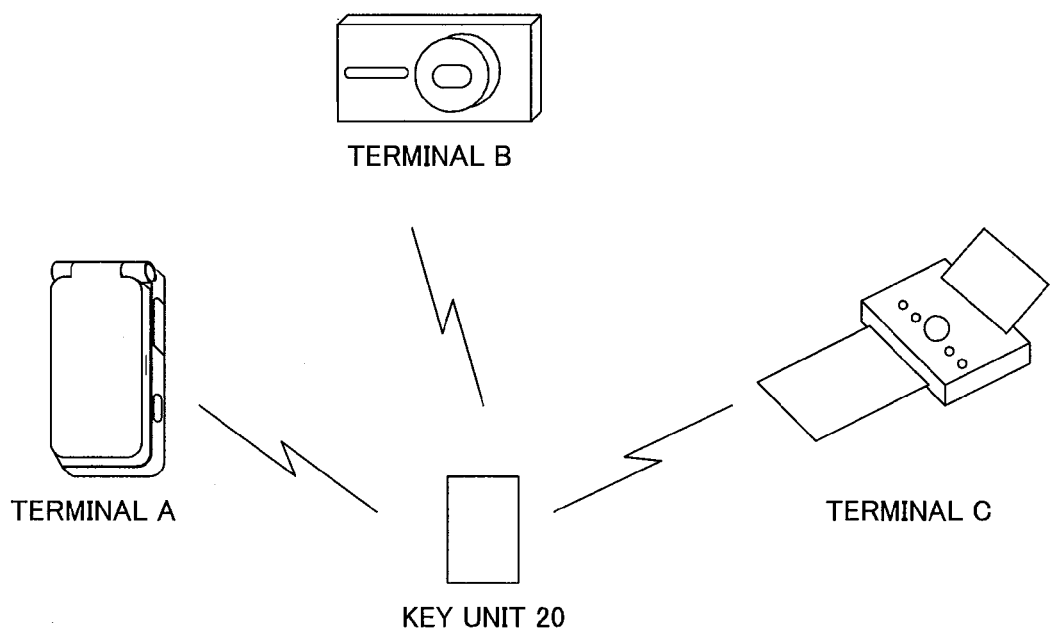
FIG. 4 shows a use limiting system by a conventional wireless communication unit and a plurality of mobile terminal apparatuses.
Figure 5:
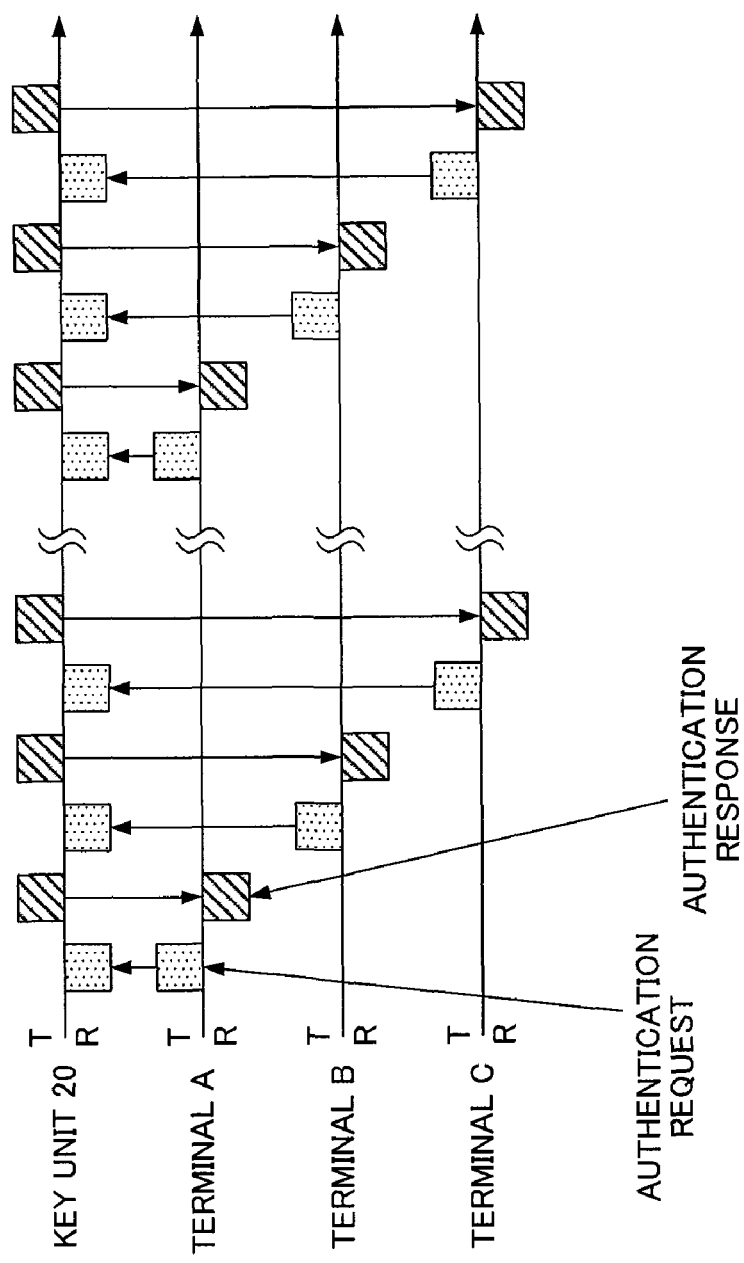
FIG. 5 shows the operation of wireless authentication between the wireless communication unit and terminals of FIG. 4.

With a conventional example, as shown in FIG. 5, while 1-to-1 communications of authentication requests/authentication responses by the key unit and terminal A to C are combined, the 1-to-N communication scheme of the present embodiment realizes 1-to-N communication of lower power consumption by transmitting an authentication response signal at a timing only parties that can be authenticated receive this signal successfully.

Next, features of the 1-to-N communication scheme of the present embodiment of [Search/Authentication], [Key Unit] and [Terminal] will be explained. [Search/Authentication] (a) In order from terminals authenticated by a key unit in a search channel, a timing to transmit an authentication request is determined. [Key Unit] (b) A response is transmitted at a time to (a plurality of) terminals that are successfully authenticated. (c) By shifting the transmission timing of a transmission signal, this transmission signal is sent only to (a plurality of) terminals that are successfully authenticated. (d) The number of currently authenticated terminals is reported using the header of the authentication response. [Terminal] (e) Depending on the timing (i.e. slot) to transmit an authentication request, a subsequent carrier sensing pattern is determined. (f) In case where a response is successfully received from the key unit, subsequent carrier sensing is stopped. (g) How many times carrier sensing is performed or which pattern is used is determined based on the number of currently authenticated terminals.

FIGS. 8A to C show the operations of wireless authentication between the key unit and terminals A to C, where FIG. 8A shows a case where signals of all terminals are OK, FIG. 8B shows a case where the signal of terminal B is NG, and FIG. 8C shows carrier sensing by each terminal. Terminal A and terminal B of FIG. 8 are mobile terminal apparatuses 100A and 100B of FIG. 6, and terminal C is the mobile terminal apparatus that is not shown in FIG. 6.

As shown in FIG. 8A, in the order terminals were authenticated by key unit 200 in a search channel, the timing to transmit an authentication request is determined. Terminals A to C each determine the subsequent carrier sensing pattern according to the timing (i.e. slot) to transmit an authentication request. Key unit 200 receives the authentication request from each terminal A to C. In order from the numbers 1, 2, 3 and . . . , slots are assigned sequentially to terminals A to C that are successfully authenticated. Key unit 200 transmits a common authentication response signal at a time to terminals A to C that are successfully authenticated. In FIG. 8A, key unit 200 transmits the authentication response at a time by common carrier sensing between all terminals A to C. Terminals A to C that has successfully received the response from key unit 200 stop subsequent carrier sensing.

Further, as shown in FIG. 8B, key unit 200 receives the authentication request from each terminal A to C. Assume that the signal of terminal B is NG. Key unit 200 assigns slots sequentially to terminals A and C that are successfully authenticated. The signal of terminal B is NG and therefore a slot is not assigned to number 2. To transmit the authentication response only to terminals A and C that are successfully authenticated, as shown by the broken line of FIG. 8B, key unit 200 transmits the authentication response by shifting a transmission timing of the authentication response, to the timing only terminals A and C successfully receive this response. Terminals A and C that has successfully received the response from key unit 200 stop the subsequence carrier sensing (see carrier sensing shown by the broken line of FIG. 8B). Terminal B that does not successfully receive the response from key unit 200 continues carrier sensing as is according to the carrier sensing pattern.

Further, as shown in FIG. 8C, the carrier sensing pattern of each terminal A to C waiting for an authentication response from key unit 200 is configured to include the following patterns (I) to (III). That is, these patterns include pattern (I) of the timing the carrier sense timings of all terminals A to C match, pattern (II) where carrier sense timings of terminal A and terminal B, terminal A and terminal C, or terminal B and terminal C match and pattern (III) of a timing with which only one of terminal A to C matches. By utilizing the carrier sensing patterns of above terminals A to C and shifting the transmission timing of the transmission signal, key unit 200 can transmit an authentication response only to terminals that are successfully authenticated.

To sum up, (1) in 1-to-N communication, a timing to transmit an authentication response from a terminal is determined in the order terminals were authenticated by the key unit in a search channel. (2) The authentication requests received from terminals are cross-checked, and a response is returned at a timing only a plurality of terminals that are successfully authenticated receive this response successfully. (3) Terminals that are currently authenticated by the key unit each determine the carrier sensing pattern for receiving a response from the key unit, according to the timing (i.e. slot) to transmit an authentication response, and receive this carrier sensing pattern.

Figure 9A:
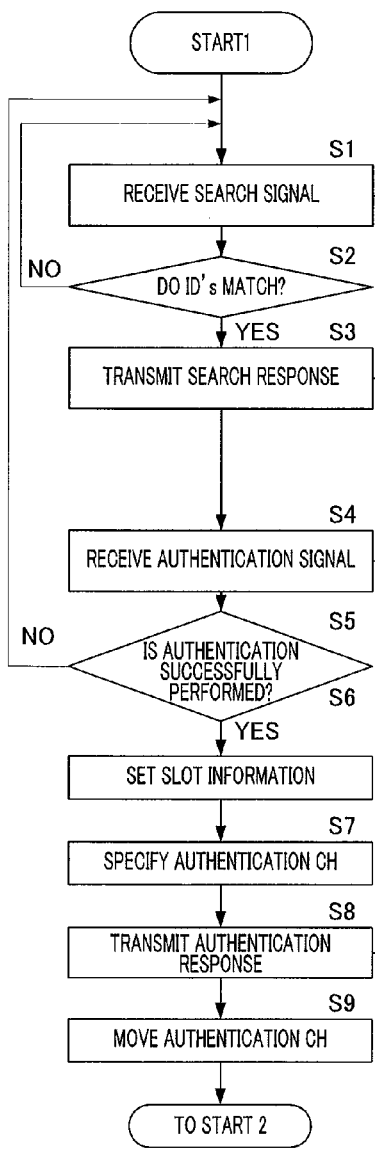
FIGS. 9A and B are flowcharts showing search operations by a wireless communication unit and mobile terminal apparatus according to an embodiment of the present invention.
Figure 9B:
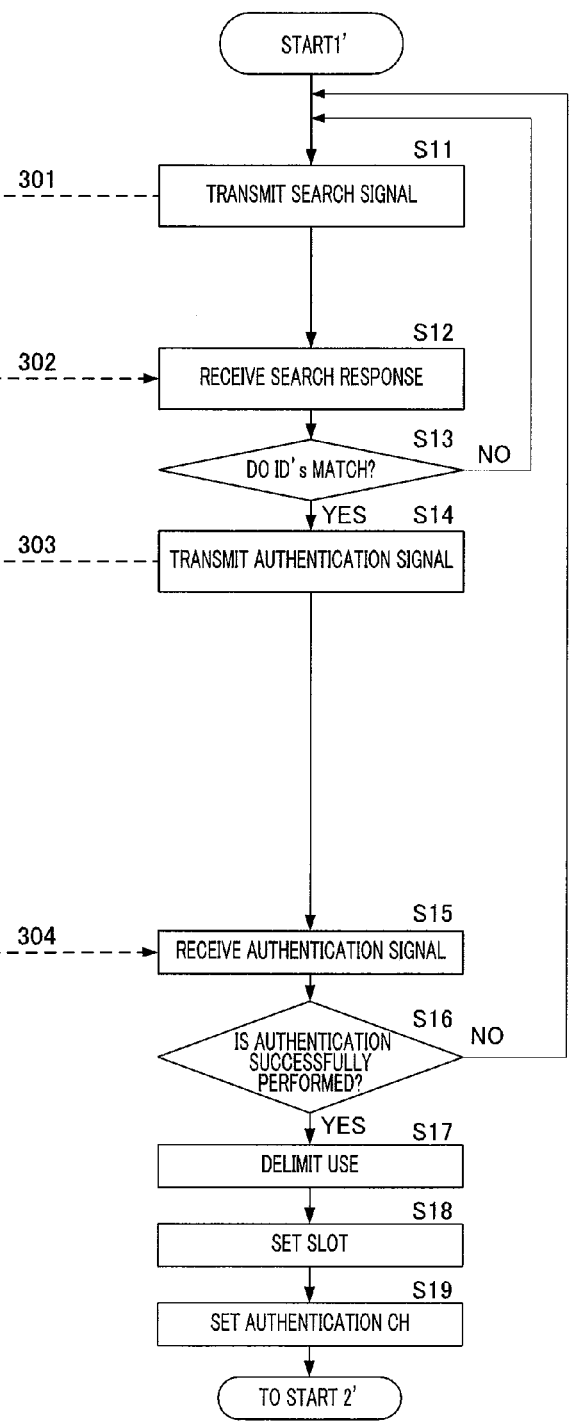
FIGS. 9C and D are flowcharts showing authentication operations between a wireless communication unit and mobile terminal apparatus according to an embodiment of the present invention.
Figure 9C:
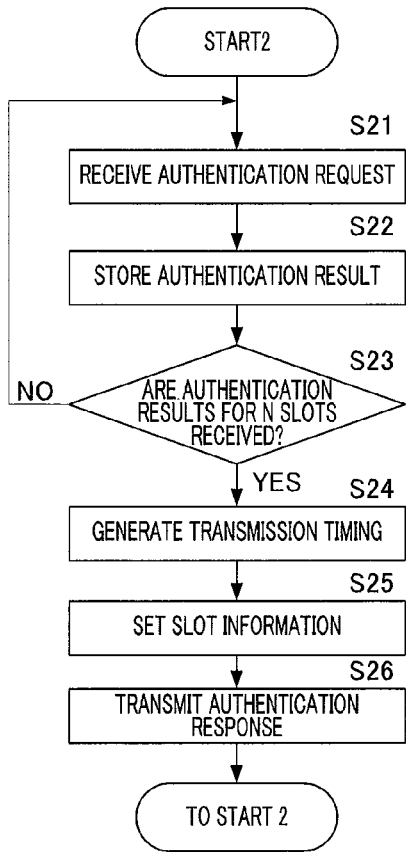
Figure 9D:
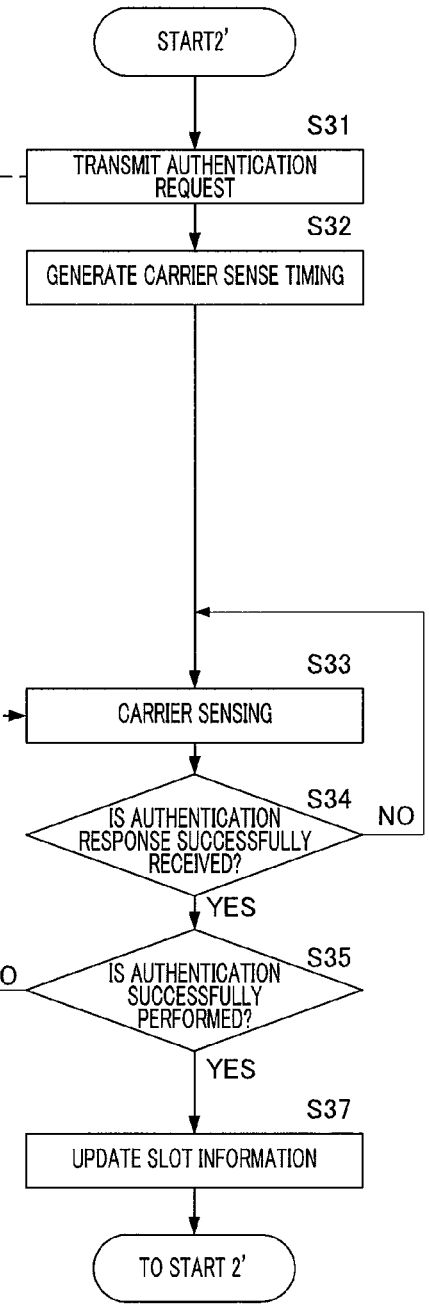

FIGS. 9A to D are flowcharts showing search operations and authentication operations by a key unit and mobile terminal apparatuses, where FIG. 9A is a search flow by key unit 200, FIG. 9B is a search flow by mobile terminal apparatus 100A, FIG. 9C is an authentication flow by key unit 200 and FIG. 9D is an authentication flow by mobile terminal apparatus 100A. These flows are executed by wireless authentication controlling section 204 of key unit 200 and wireless authentication section 107 of mobile terminal apparatus 100A. In the drawings, "S" represents each "step" in the flow, and a broken arrow represents a control sequence between controlling sections.

[Search Operation by Key Unit 200]

After the search flow of FIG. 9A starts (Start 1), a search signal is received from mobile terminal apparatus 100A (hereinafter, "terminal") in step S1 (see number 301).

In step S2, whether or not ID's match is decided, and, if ID's do not match, reception of a search signal is continued in above step S1. If ID's match, a search response is transmitted to the terminal in step S3 (see number 302).

In step S4, an authentication signal is received from the terminal (see number 303).

In step S5, whether or not authentication has been successfully performed is decided, and, if authentication has not been successfully performed, reception of a search signal is continued in above step S1.

If authentication has been successfully performed, slot information controlling section 206 sets slot information in step S6, and specifies the authentication channel in step S7. Slot information controlling section 206 assigns slot numbers sequentially to terminals that have been successfully authenticated.

In step S8, the authentication response is transmitted to the terminal (see number 304). Wireless authentication section 204 reports the slot numbers assigned by slot information controlling section 206 and the total number of authenticated terminals, to terminals that have been successfully authenticated through transmitting-receiving section 202. The carrier sensing pattern is determined based on the slot assigned to the terminal and the total number of terminals that are authenticated by key unit 200.

In step S9, it is decided that processing in an applicable channel is finished by transmitting the authentication response in above step S8, and the flow is finished and the operation transitions to the authentication flow by key unit 200 (FIG. 9C). A specific example of movement of an authentication channel will be described later using FIGS. 10A to C and FIGS. 13A to C.

[Search Operation by the Terminal]

After the search flow of FIG. 9B starts (Start 1'), a search signal is transmitted to key unit 200 in step S11 (see number 301).

In step S12, a search response is received from key unit 200 (see number 302), whether or not ID's match is decided in step S13.

If ID's do not match, transmission of a search signal is continued in above step S11. If ID's match, an authentication signal is transmitted to key unit 200 in step S14 (see number 303).

In step S15, an authentication signal is received from key unit 200 (see number 304).

In step S16, whether or not authentication has been successfully performed is decided, and, if authentication has not been successfully performed, transmission of a search signal is continued in above step S11.

If authentication has been successfully performed, the use of wireless authentication section 107 is delimited in step S17.

In step S18, slot information acquiring section 114 acquires a slot number from key unit 200 and sets a slot, and, in step S19, specifies the authentication channel and finishes the present flow, and the operation transitions to the authentication flow (FIG. 9D) by the terminal.

[Authentication Operation by Key Unit 200]

After the authentication flow of FIG. 9C starts (Start 2), an authentication request is received from a terminal in step S21 (see number 305).

In step S22, authentication results are stored, and, in step S23, whether or not authentication results for N slots are received is decided.

If authentication results for N slots are not received, the step returns to above step S21, and reception of authentication requests and storage of authentication results are continued until authentication results for N slots are received.

If authentication results for N slots are received, in step S24, transmission timing controlling section 107 generates a carrier sense timing to transmit an authentication response at the timing all terminals from which authentication requests are successfully received perform carrier sensing.

In step S25, slot information controlling section 206 assigns slot numbers sequentially to terminals that are successfully authenticated and sets slot information.

In step S26, the authentication response is transmitted to terminals that are successfully authenticated (see number 306), and the authentication flow returns to step S21 (Start 2). With this authentication response, the slot numbers assigned by slot information controlling section 206 and the total number of authenticated terminals are transmitted together.

[Authentication Operation by the Terminal]

After the authentication flow of FIG. 9D starts (Start 2'), an authentication request is transmitted to key unit 200 in step S31 (see number 305).

In step S32, carrier sense timing generating section 115 generates a carrier sense timing based on the acquired slot number.

In step S33, an authentication response is received from key unit 200 (see number 306), how many times carrier sensing is performed and which pattern is used are determined based on the number of currently authenticated terminals. Further, if a response has been successfully received from key unit 200, subsequent carrier sensing is stopped.

In step S34, whether or not an authentication response has been successfully received from key unit 200 is decided, and, if the authentication response has not been successfully received, the step returns to above step S33 to wait until the authentication response is successfully received.

If the authentication response has been successfully received, whether or not authentication has been successfully performed in step S35 is decided. If authentication has not been successfully performed, a use limit is set in step S36 and the operation transitions to the search flow by the terminal (Start 1').

If authentication has been successfully performed in above step S35, slot information acquiring section 114 updates slot information in step S37, and the operation returns to step S31 of the authentication flow (Start 2').

Next, referring to a case as an example where the number of N slots increases or decreases, the specific operation of 1-to-N communication between a key unit and mobile terminal apparatus will be explained.

[The Operation in Case Where the Number of N Slots Increases from Two to Three in 1-to-N Communication]

FIGS. 10A to C illustrate operations in case where the number of N slots increases from two to three in 1-to-N communication, where FIG. 10A shows the operation during authentication assuming that N=2, FIG. 10B shows the operation in case where terminal A is added and FIG. 10C shows changes in the carrier sensing patterns of terminals B and C.

Figure 11:
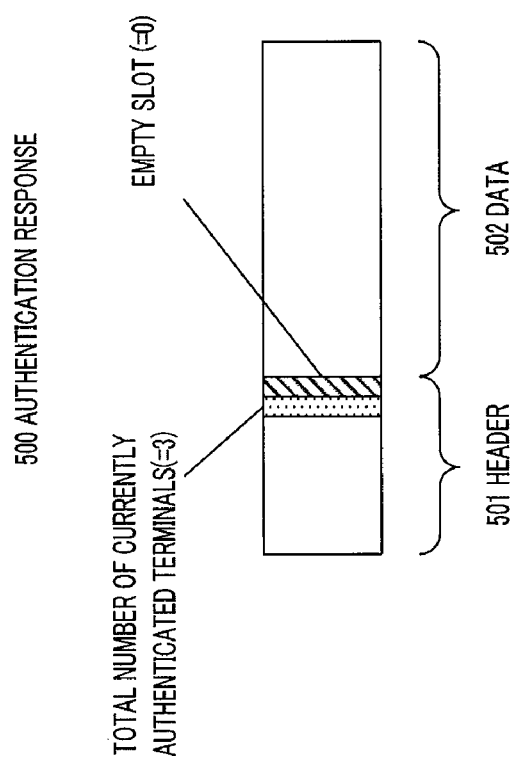
FIG. 11 shows the structure of a header and data of an authentication response of FIG. 10B.

FIG. 11 shows the structure of a header and data of the authentication response of FIG. 10. In FIG. 11, authentication response 500 is formed with: header 501 which includes an empty slot and the total number of currently authenticated terminals; and data 502.

Figure 12:
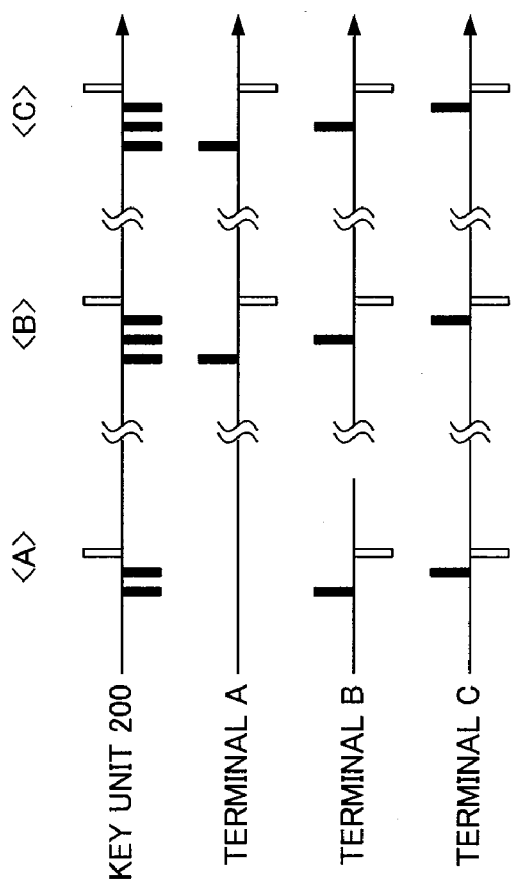
FIG. 12 shows an example of a change in a carrier sensing pattern of FIG. 10C.

FIG. 12 shows an example of changes in the carrier sensing patterns of FIG. 10C.

As shown by a. in FIG. 10A, assuming N=2, key unit 200 is authenticating with terminals B and C which transmit authentication requests. In order from the numbers 1, 2, 3 and . . . , slots are assigned sequentially to terminals C and B that are successfully authenticated. As shown by b. in FIG. 10A, the total number of currently authenticated terminals is 2, and terminals B and C use N=2 with respect to this total number (=2) and therefore the number of empty slots is zero. Wireless authentication controlling section 204 of key unit 200 (FIG. 6) reports the slot numbers assigned by slot information controlling section 206 and the total number of authenticated terminals, to terminals B and C that are successfully authenticated through transmitting-receiving section 202. Further, as shown by c. of FIG. 10A, slot information acquiring sections 114 of wireless authentication controlling sections 113 of terminals B and C acquire the total number of terminals authenticated by key unit 200 and slot information assigned to terminals B and C. Carrier sense timing generating section 115 generates a carrier sense timing and carrier sensing pattern based on the above acquired slot information. The carrier sensing pattern at this time is represented by <A> of FIG. 12.

After terminal A is added, the operation transitions to FIG. 10B. As shown by a. of FIG. 10B, if terminals are added, slots are assigned numbers in order of numbers. In this case, if terminal A is added, the slot is assigned number 3 next to number 2. As shown by b. of FIG. 10B, key unit 200 reports the total number of currently authenticated terminals (=N), to terminals A, B and C using the header of the authentication response. FIG. 11 shows the structure of the header and data of the authentication response in this case. The total number of currently authenticated terminals (=3) and an empty slot (=0) are added to the header. In order to send the authentication response signal of FIG. 11 to all terminals at this moment, that is, to terminals A, B and C, this authentication response signal is transmitted by shifting its transmission timing to a timing terminals A, B and C successfully receive this signal. Terminals A, B and C that successfully receive the response from key unit 200 stop subsequent carrier sensing (see carrier sensing shown by the broken line of c. of FIG. 10B). The carrier sensing pattern for transmitting a response to all terminals A to C is represented by <B> of FIG. 12.

After the above authentication response is reported, the operation transitions to FIG. 10C. As shown by a. of FIG. 10C, in terminals A, B and C that receive the above authentication response, terminals B and C, not including terminal A that is added, change the carrier sensing pattern for the next carrier sensing, based on the updated slot information (i.e. slot number and the total number of authenticated terminals) showing that terminal A has been added. This changed carrier sensing pattern is represented by <C> of FIG. 12. In this case, the carrier sensing pattern is the same as <B> and <C> of FIG. 12. After receiving the authentication response, terminals A, B and C stop carrier sensing and therefore are shown by the broken lines in FIG. 10B and FIG. 10C. As is clear from the comparison of the carrier sensing patterns in FIG. 10B and FIG. 10C, the carrier sensing patterns of terminals B and C are changed.

[The Operation in Case Where the Number of N Slots Decreases from Three to Two in 1-to-N Communication]

FIGS. 13A to C illustrate operations in case where the number of N slots decreases from three to two in 1-to-N communication, where FIG. 13A shows the operation during authentication assuming that N=3, FIG. 13B shows the operation in case where terminal B leaves and FIG. 13C shows slot movement of terminal A.

Figure 14:
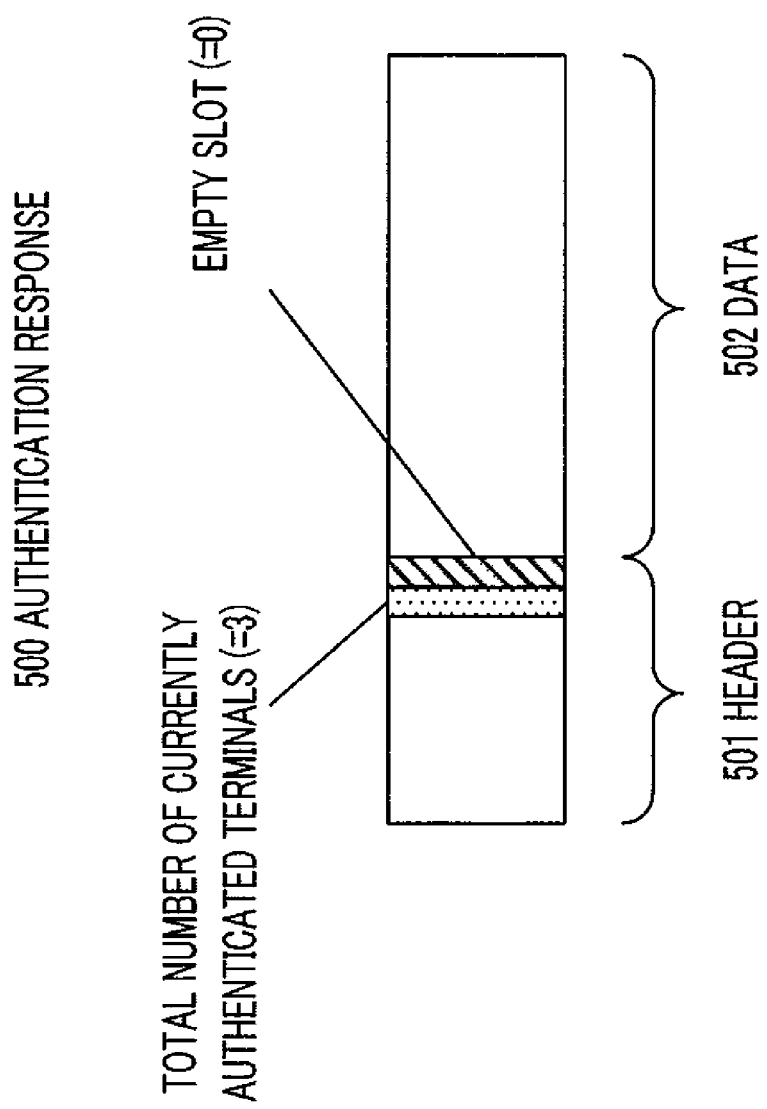
FIG. 14 shows the structure of a header and data of an authentication response of FIG. 13.
Figure 15:
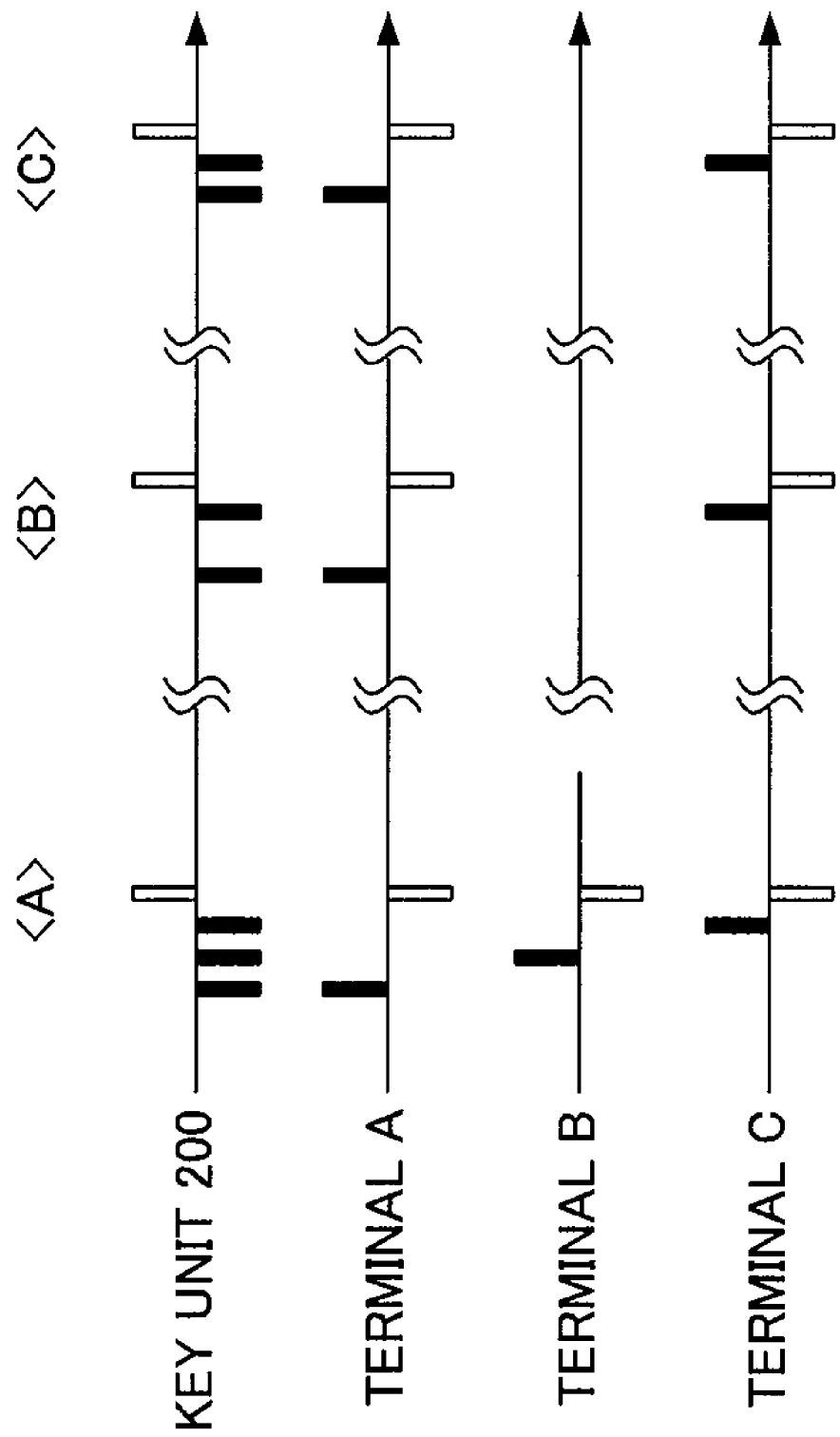
FIG. 15 shows an example of a change in a carrier sensing pattern of FIG. 13.

Further, FIG. 14 shows the structure of the header and data of an authentication response of FIG. 13A. The portions of the same configurations as in FIG. 11 will be assigned the same reference numerals. FIG. 15 shows an example of the change in carrier sensing patterns in FIG. 13B.

As shown by a. of FIG. 13A, assuming that N=3, key unit 200 is authenticating terminals A, B and C that transmit authentication requests. In order from the numbers 1, 2, 3, 4 and . . . , key unit 200 assigns slots sequentially to terminals C, B and A that have been successfully authenticated. As shown by b. of FIG. 13A, key unit 200 reports the total number of currently authenticated terminals (=N), to terminals A, B and C using the header of the authentication response. FIG. 14 shows the structure of the header and data of the authentication response in this case. The total number of currently authenticated terminals (=3) and an empty slot (=0) are added to the header. In order to send the authentication response signal of FIG. 14 to all terminals at this moment, that is, terminals A, B and C, this authentication response signal is transmitted by shifting its transmission timing to a timing terminals A, B and C successfully receive this signal. Terminals A, B and C that have successfully received the response from key unit 200 stop subsequent carrier sensing (see carrier sensing shown by the broken line of FIG. 13A). The carrier sensing pattern for transmitting a response to all terminals A to C is represented by <A> of FIG. 15.

After terminal B leaves, the operation transitions to FIG. 13B. As shown by a. of FIG. 13B, if a terminal leaves, slots are assigned numbers in order of numbers by skipping the number of the terminal that leaves. In this case, terminal B leaves and therefore a slot is assigned number 3 by skipping number 2 next to number 1. As shown by b. of FIG. 13B, the total number of currently authenticated terminals is three, and the number of empty slots is two with respect to this total number (=3) because terminal B leaves. Key unit 200 reports the total number of currently authenticated terminals (=N), to terminals A and C using the header of the authentication response. In order to send an authentication response to terminals A and C, the authentication response is transmitted by shifting its transmission timing to a timing terminals A and C successfully receive this response. Terminals A and C that have successfully received the response from key unit 200 stop subsequent carrier sensing (see carrier sensing shown by the broken line of c. of FIG. 13B). The carrier sensing pattern for transmitting the response to terminals A and C is represented by <B> of FIG. 15. Further, terminals A and C learn that the number of N's has decreased, upon receiving the authentication response and changes how many times carrier sensing is performed, from the next time. That is, based on updated slot information (i.e. slot numbers and the total number of authenticated terminals) showing that terminal B has left, how many times carrier sensing is performed is changed from the next time. This changed carrier sensing pattern is represented by <C> of FIG. 15.

If terminal B leaves, the slot of terminal A moves and the operation transitions to FIG. 13C.

As shown by a. of FIG. 13C, if terminal B leaves, the terminal of the largest slot number (i.e. terminal A) changes its slot. Then, as shown by b. of FIG. 13C, the total number of currently authenticated terminals (=2) is reported to terminals A and C using the header of the authentication response. In order to send the authentication response to terminals A and C, the authentication response is transmitted by shifting its transmission timing to a timing terminals A and C successfully receive this response.

As described above, according to the present embodiment, after the authentication request is transmitted, each terminal performs carrier sensing according to a pattern matching a timing the authentication response is transmitted and waits for the authentication response from key unit 200 Key unit 200 transmits the authentication response at a timing the carrier sense timings of a plurality of terminals that have been successfully authenticated based on authentication requests from the terminals match. By this means, key unit 200 can realize 1-to-N communication with low power consumption by transmitting an authentication response at a time only to the parties that have been authenticated. Although battery 22 of comparatively small capacity can only be mounted in key unit 200 of a small housing such as a key ring in particular, it is possible to reduce consumption of valuable power of battery 22.

Further, it is possible to reduce the time to occupy the band in transmission and reception for authentication requests and responses, so that it is possible to increase the number of pairs coexisting per channel and reduce the influence of interference.

The above explanation is an illustration of a preferred embodiment of the present invention and the scope of the present invention is not limited to this. Although an example has been explained where a mobile terminal apparatus is applied to a mobile telephone, the mobile terminal apparatus is not limited to the mobile telephone, and is applicable to mobile information terminals such as PDA's, personal computers or its integrated apparatus and mobile devices such as MP3 players, HDD players and mobile video game machines.

Further, although the names such as "mobile terminal apparatus," "wireless communication unit," "wireless communication system" and "wireless communication method" are used with the present embodiment for ease of explanation, it naturally follows that "mobile telephone," "device use limiting apparatuses" and 1-to-N communication method" may be possible.

The type, the number of and the connecting method of circuit sections forming the above mobile terminal apparatus and wireless communication unit such as a wireless authentication section are not limited to the above-described embodiment.

Further, the above-explained mobile terminal apparatus, wireless communication unit and wireless communication method are implemented by the program for functioning these mobile terminal apparatus, wireless communication unit and wireless communication method. This program is stored in a computer-readable recording medium.

INDUSTRIAL APPLICABILITY

The mobile terminal apparatus, wireless communication unit and wireless communication method according to the present invention are suitable for use in a mobile terminal apparatus such as a mobile telephone that performs wireless authentication by transmitting and receiving radio signals to and from a wireless communication unit, and an authentication controlling system. Further, the mobile terminal apparatus, wireless communication unit and wireless communication method are also effective for use in a 1-to-N communication method between a base unit and mobile terminal apparatuses such as a plurality of mobile telephones/PHS's, PDA's, notebook PC's, MP3 players, HDD players and so on. Furthermore, the mobile terminal apparatus, wireless communication unit and wireless communication method can be embedded as a wireless communication program in mobile devices such as mobile telephones.

The invention claimed is:

1. A mobile terminal apparatus configured to perform wireless authentication by transmitting and receiving radio signals to and from a wireless communication unit, the mobile terminal apparatus comprising:
   a determining section, of a processor of the mobile terminal apparatus, configured to determine a carrier sensing pattern for receiving, via an antenna, an authentication response from the wireless communication unit, according to a timing to transmit authentication responses to the wireless communication unit, and to determine how many times carrier sensing is performed according to a total number of currently authenticated mobile terminal apparatuses which is added to the authentication response; and
   a carrier sensing section, of the processor, configured to perform the carrier sensing according to the determined carrier sensing pattern.

2. The mobile terminal apparatus according to claim 1, wherein the carrier sensing section, of the processor, is further configured to stop subsequent carrier sensing when the authentication response is successfully received from the wireless communication unit.

3. The mobile terminal apparatus according to claim 1, further comprising a slot information acquiring section, of the processor, configured to acquire a slot number and the total number of currently authenticated mobile terminal apparatuses that are added in the authentication response from the wireless communication unit,
   wherein the determining section, of the processor, is further configured to determine a carrier sense timing and the carrier sensing pattern based on the acquired slot number and the total number of currently authenticated mobile terminal apparatuses.

4. A wireless communication unit configured to perform wireless communication with a plurality of mobile terminal apparatuses, the wireless communication unit comprising:
   a wireless authentication controlling section, of a processor of the wireless communication unit, configured to perform wireless authentication by transmitting and receiving radio signals to and from the plurality of mobile terminal apparatuses; and a transmission timing controlling section, of the processor, configured to cross-check authentication requests from the plurality of mobile terminal apparatuses and to transmit an authentication response at a transmission timing such that only mobile terminal apparatuses that are successfully authenticated receive the authentication response successfully, and to transmit a total number of mobile terminal apparatuses that are currently authenticated by the wireless communication unit, via the authentication response.

5. The wireless communication unit according to claim 4, wherein the transmission timing controlling section, of the processor, is further configured to transmit the authentication response at the transmission timing that matches respective carrier sense timings of the plurality of mobile terminal apparatuses that are successfully authenticated.

6. The wireless communication unit according to claim 4, wherein the authentication response is common to the plurality of mobile terminal apparatuses that are successfully authenticated.

7. The wireless communication unit according to claim 4, wherein the transmission timing controlling section, of the processor, is further configured to shift the transmission timing to a carrier sense timing such that only the authenticated mobile terminal apparatuses successfully receive the authentication response based on a respective carrier sensing pattern of the mobile terminal apparatuses.

8. The wireless communication unit according to claim 4, wherein the transmission timing controlling section, of the processor, is further configured to add an empty slot to a header of the authentication response.

9. A wireless communication system that is formed with a wireless communication unit and a plurality of mobile terminal apparatuses configured to perform wireless authentication by transmitting and receiving radio signals to and from the wireless communication unit, wherein:
the plurality of mobile terminal apparatuses each comprise:
a determining section, of a processor of each of the mobile terminal apparatuses, configured to determine a carrier sensing pattern for receiving, via an antenna, authentication responses from the wireless communication unit, according to a timing to transmit an authentication response to the wireless communication unit, and to determine how many times carrier sensing is performed according to a total number of currently authenticated mobile terminal apparatuses which is added to the authentication response; and
a carrier sensing section, of the processor of each of the mobile terminal apparatuses, configured to perform the carrier sensing according to the determined carrier sensing pattern; and
the wireless communication unit comprises:
a wireless authentication controlling section, of a processor of the wireless communication unit, configured to perform wireless authentication by transmitting and receiving radio signals to and from the plurality of mobile terminal apparatuses; and
a transmission timing controlling section, of the processor of the wireless communication unit, configured to cross-check authentication requests from the plurality of mobile terminal apparatuses and to transmit the authentication response at a transmission timing such that only mobile terminal apparatuses that are successfully authenticated receive the authentication response successfully, and to transmit a total number of mobile terminal apparatuses that are currently authenticated by the wireless communication unit, via the authentication response.

10. A mobile communication method comprising the steps of:
performing, at a processor of a mobile terminal apparatus, wireless authentication by transmitting and receiving radio signals to and from a wireless communication unit;
determining, at the processor, a carrier sensing pattern for receiving an authentication response from the wireless communication unit, according to a timing to transmit authentication responses to the wireless communication unit, and determining how many times carrier sensing is performed according to a total number of currently authenticated mobile terminal apparatuses which is added to the authentication response; and
performing, at the processor, the carrier sensing according to the determined carrier sensing pattern.

11. A wireless communication method comprising the steps of:
performing, at a processor of a wireless communication unit, wireless authentication by transmitting and receiving radio signals to and from a plurality of mobile terminal apparatuses; and
cross-checking, at the processor, authentication requests from the plurality of mobile terminal apparatuses and transmitting an authentication response at a transmission timing such that only mobile terminal apparatuses that are successfully authenticated receive the authentication response successfully, and transmitting a total number of mobile terminal apparatuses that are currently authenticated by the wireless communication unit, via the authentication response.

12. A wireless communication method in a wireless communication system formed with a plurality of mobile terminal apparatuses that perform wireless authentication by transmitting and receiving radio signals to and from a wireless communication unit, wherein
at least one of the plurality of the mobile terminal apparatuses executes the steps of:
determining, at a processor of the at least one of the plurality of mobile terminal apparatuses, a carrier sensing pattern for receiving an authentication response from the wireless communication unit, according to a timing to transmit authentication responses to the wireless communication unit, and determining how many times carrier sensing is performed according to a total number of currently authenticated mobile terminal apparatuses which is added to the authentication response; and
performing, at the processor of the at least one of the plurality of mobile terminal apparatuses, the carrier sensing according to the determined carrier sensing pattern; and
the wireless communication unit executes the steps of:
performing, at a processor of the wireless communication unit, wireless authentication by transmitting and receiving radio signals to and from the plurality of mobile terminal apparatuses; and
cross-checking, at the processor of the wireless communication unit, authentication requests from the plurality of mobile terminal apparatuses and transmitting an authentication response at a transmission timing such that only mobile terminal apparatuses that are successfully authenticated receive the authentication response successfully, and transmitting a total number of mobile terminal apparatuses that are currently authenticated by the wireless communication unit, via the authentication response.

13. The mobile terminal apparatus according to claim 1, wherein the received authentication response is a common authentication response signal to the currently authenticated mobile terminal apparatuses.

14. The wireless communication unit according to claim 4, wherein the transmission timing controlling section, of the processor, which is configured to transmit a total number of mobile terminal apparatuses that are currently authenticated by the wireless communication unit, via the authentication response, adds a total number of mobile terminal apparatuses that are currently authenticated by the wireless communication unit, to a header of the authentication response.

15. The wireless communication unit according to claim 4, wherein the wireless communication unit specifies an authentication channel prior to transmitting the authentication response at the transmission timing.

16. The wireless communication unit according to claim 7, wherein the shift of the transmission timing to the carrier sense timing occurs after a change in the number of authenticated mobile terminal apparatuses.

17. The wireless communication unit according to claim 7, wherein the shift of the transmission timing to the carrier sense timing occurs after the number of authenticated mobile terminal apparatuses increases.

* * * * *